US012599986B2

(12) United States Patent
Yamanaka et al.

(10) Patent No.: US 12,599,986 B2
(45) Date of Patent: Apr. 14, 2026

(54) ULTRASONIC HORN, SECONDARY BATTERY, AND METHOD FOR MANUFACTURING SECONDARY BATTERY

(71) Applicant: Vehicle Energy Japan Inc., Hitachinaka (JP)

(72) Inventors: Hiroshi Yamanaka, Ibaraki (JP); Takeshi Nanaumi, Hitachinaka (JP)

(73) Assignee: Vehicle Energy Japan, Inc., Ibaraki (JP)

( * ) Notice: Subject to any disclaimer, the term of this patent is extended or adjusted under 35 U.S.C. 154(b) by 0 days.

(21) Appl. No.: 18/946,246

(22) Filed: Nov. 13, 2024

(65) Prior Publication Data

US 2025/0065435 A1 Feb. 27, 2025

Related U.S. Application Data

(63) Continuation of application No. 17/621,873, filed as application No. PCT/JP2020/026282 on Jul. 3, 2020, now Pat. No. 12,172,226.

(30) Foreign Application Priority Data

Jul. 31, 2019 (JP) ................................. 2019-141746

(51) Int. Cl.
    *B23K 20/10* (2006.01)
    *B23K 20/26* (2006.01)
    (Continued)

(52) U.S. Cl.
    CPC ............ *B23K 20/10* (2013.01); *B23K 20/106* (2013.01); *B23K 20/26* (2013.01); (Continued)

(58) Field of Classification Search
    CPC ................ B23K 20/26; B23K 37/0408; B23K 2101/36; B23K 2103/10; B23K 2103/12; (Continued)

(56) References Cited

U.S. PATENT DOCUMENTS 5,868,301 A   2/1999  Distefano et al.
8,651,163 B1  2/2014  Widhalm
(Continued)

FOREIGN PATENT DOCUMENTS

CN     202461801 U   10/2012
CN     108475756 A   8/2018
(Continued)

OTHER PUBLICATIONS

Extended European Search Report issued on Apr. 10, 2025 for European Patent Application No. 24219943.8.
(Continued)

*Primary Examiner* — Kiley S Stoner
(74) *Attorney, Agent, or Firm* — Volpe Koenig

(57) ABSTRACT

An ultrasonic horn reduces the likelihood of damaging a plurality of stacked sheets of metal foil when the stacked sheets and a metal member are ultrasonically bonded by applying ultrasonic vibration to the stacked sheets. An ultrasonic horn is used for ultrasonically bonding a plurality of stacked sheets of negative electrode foil and a negative electrode collector plate by applying ultrasonic vibration to the stacked sheets of negative electrode foil. The horn includes a horn body, a first protrusion having a first surface that is a curved surface and protruding from an opposing surface of the horn body facing the anvil toward the anvil, and a second protrusion provided at a center of the first surface of the first protrusion and protruding toward the anvil. The second protrusion includes an end surface that is a planar surface and a second surface connecting the end surface and the first surface.

8 Claims, 8 Drawing Sheets

(51) Int. Cl.
    *B23K 37/04*         (2006.01)
    *H01M 10/0587*     (2010.01)
    *H01M 50/536*      (2021.01)
    *B23K 101/36*      (2006.01)

(52) U.S. Cl.
    CPC ..... *B23K 37/0408* (2013.01); *H01M 10/0587* (2013.01); *H01M 50/536* (2021.01); *B23K 2101/36* (2018.08)

(58) Field of Classification Search
    CPC ........ B23K 2103/18; B23K 20/10–106; B23K 20/2333; B23K 1/06; H01M 10/0587; H01M 50/536; H01M 4/043; H01M 10/0431; H01M 50/538; Y02E 60/10; Y02P 70/50
    USPC ......................................... 228/1.1, 58, 110.1
    See application file for complete search history.

(56)            References Cited

U.S. PATENT DOCUMENTS

| | | | |
|---|---|---|---|
| 9,209,432 | B2 | 12/2015 | Saimaru |
| 2006/0169388 | A1* | 8/2006 | Shimizu .............. B29C 66/1122 |
| | | | 156/580.2 |
| 2014/0255768 | A1* | 9/2014 | Jang ................... H01M 50/561 |
| | | | 429/211 |
| 2018/0085847 | A1 | 3/2018 | Sato |
| 2018/0358608 | A1 | 12/2018 | Mino |
| 2019/0001583 | A1 | 1/2019 | Sato |
| 2019/0009357 | A1 | 1/2019 | Miyashiro et al. |
| 2019/0047079 | A1 | 2/2019 | Miyashiro et al. |
| 2019/0224776 | A1 | 7/2019 | Hirose |
| 2019/0273262 | A1 | 9/2019 | Matsumasa |
| 2020/0212501 | A1 | 7/2020 | Matsumasa |
| 2021/0154944 | A1* | 5/2021 | Ogaya .............. B29C 66/91231 |

FOREIGN PATENT DOCUMENTS

| | | | | | |
|---|---|---|---|---|---|
| CN | 109202259 | A | | 1/2019 | |
| CN | 109202260 | A | | 1/2019 | |
| EP | 3118914 | A1 | | 1/2017 | |
| JP | H10-244380 | A | | 9/1998 | |
| JP | 2003-346877 | A | | 12/2003 | |
| JP | 2004-071199 | A | | 3/2004 | |
| JP | 2004-79563 | A | | 3/2004 | |
| JP | 2006-278849 | A | | 10/2006 | |
| JP | 2012-209269 | A | | 10/2012 | |
| JP | 2014-212012 | A | | 11/2014 | |
| JP | 2014213366 | A | * | 11/2014 | ............ B23K 20/10 |
| JP | 2015-199095 | A | | 11/2015 | |
| JP | 2016107291 | A | * | 6/2016 | |
| JP | 2017-054704 | A | | 3/2017 | |
| JP | 2018-51629 | A | | 4/2018 | |
| JP | 2019-10655 | A | | 1/2019 | |
| JP | 2019-30888 | A | | 2/2019 | |
| JP | 2019-034316 | A | | 3/2019 | |
| JP | 2019-139954 | A | | 8/2019 | |
| JP | 2020-059052 | A | | 4/2020 | |
| KR | 20150016348 | A | | 2/2015 | |
| KR | 102186301 | B1 | * | 12/2020 | .......... H01M 50/466 |
| WO | 2013/105361 | A1 | | 7/2013 | |
| WO | 2013/105362 | A1 | | 7/2013 | |
| WO | 2017/203731 | A1 | | 11/2017 | |
| WO | 2020-066240 | A1 | | 4/2020 | |
| WO | 2020/071049 | A1 | | 4/2020 | |

OTHER PUBLICATIONS

International Search Report, PCT/JP2020/026282, Sep. 15, 2020 (2 pgs).
Chinese Office Action issued on May 28, 2024 for Chinese Patent Application No. 202080040788.
Chinese Office Action issued on Jun. 15, 2023 for Chinese Patent Application No. 202080040788.2.
Chinese Office Action issued on Dec. 14, 2023 for Chinese Patent Application No. 202080040788.2.
Extended European Search Report issued on Sep. 6, 2023 for European Patent Application No. 20847933.7.

* cited by examiner

ULTRASONIC HORN, SECONDARY BATTERY, AND METHOD FOR MANUFACTURING SECONDARY BATTERY

This application is a continuation of U.S. patent application Ser. No. 17/621,873, filed Dec. 22, 2021, which is a national stage application of International Patent Application No. PCT/JP2020/026282, filed Jul. 3, 2020, which claims the benefit of Japanese Patent Application No. 2019-141746, filed Jul. 31, 2019, the entire contents of which are incorporated herein by reference.

TECHNICAL FIELD

The present invention relates to an ultrasonic horn for ultrasonically bonding a plurality of stacked sheets of metal foil and a metal member by sandwiching the plurality of stacked sheets of metal foil and the metal member with an anvil and applying ultrasonic vibration to the plurality of stacked sheets of metal foil; a secondary battery; and a method for manufacturing a secondary battery.

BACKGROUND ART

Conventionally, a lithium ion secondary battery having a high energy density has been developed as a power source of an electric vehicle, for example. Particularly, as a secondary battery mounted on a vehicle or the like, a rectangular secondary battery having a high volume density is known. In this rectangular secondary battery, a positive electrode having a positive electrode active material applied on both surfaces of a positive electrode foil and a negative electrode having a negative electrode active material applied on both surfaces of a negative electrode foil are wound in a flat shape, with a separator interposed therebetween, and the winding body (i.e., electrode group) is housed in a rectangular battery case.

In such a rectangular secondary battery, an energizing path is minimized to reduce the connection resistance by forming metal-foil-exposed portions, in which a positive electrode metal foil and a negative electrode metal foil are exposed respectively at the opposite end portions of the winding body in the winding axis direction, and then connecting electrode terminals and collectors to these metal-foil-exposed portions by welding or the like.

As an ultrasonic welding method of a large number of stacked sheets of metal foil, Patent Literature 1, for example, discloses a method for performing ultrasonic welding by arranging a protective metal plate on an upper side on a horn abutting side of the large number of stacked sheets of metal foil.

Meanwhile, Patent Literature 2, for example, discloses that a distal end portion on a side of the object to be joined of the resonator is configured such that a plurality of protrusions each having an outer face not including an angular shape edge are stacked in two or more steps.

CITATION LIST

Patent Literature

Patent Literature 1: JP H10-244380 A
Patent Literature 2: JP 2019-10655 A

SUMMARY OF INVENTION

Technical Problem

In the method disclosed in the aforementioned Patent Literature 1, however, arranging a protective metal plate on the horn abutting side in ultrasonic bonding may increase the number of components and the number of manufacturing steps. Furthermore, additional bonding of the protective plate may increase the thickness of the joint part, which requires a longer time for bonding as compared to the case of not using a protective plate.

In addition, in the configuration disclosed in the aforementioned Patent Literature 2, since shearing stress concentrates on the end of the protrusion disposed adjacent to the anvil among the protrusions stacked in two steps, metal foil may be damaged. Using such metal foil to form a secondary battery, for example, may lead to a decrease in an output of the secondary battery in the long view.

The present invention has been made in view of the foregoing, and provides an ultrasonic horn, a secondary battery, and a method for manufacturing a secondary battery that can reduce the likelihood of damaging a plurality of stacked sheets of metal foil when the stacked sheets of metal foil and a metal member are ultrasonically bonded by applying ultrasonic vibration to the stacked sheets of metal foil, without using a protective metal plate.

Solution to Problem

In view of the foregoing, an ultrasonic horn according to the present invention is an ultrasonic horn for ultrasonically bonding a plurality of stacked sheets of metal foil and a metal member by sandwiching the plurality of stacked sheets of metal foil and the metal member with an anvil and applying ultrasonic vibration in a state where the ultrasonic horn abuts on the plurality of stacked sheets of metal foil, the ultrasonic horn including: a horn body, a first protrusion having a first surface that is a curved surface and protruding from an opposing surface of the horn body facing the anvil toward the anvil, and a second protrusion provided at a center of the first surface of the first protrusion and protruding toward the anvil. The second protrusion includes an end surface that is a planar surface and a second surface that is a curved surface connecting the end surface and the first surface of the first protrusion.

Advantageous Effects of Invention

According to the present invention, it is possible to provide an ultrasonic horn, a secondary battery, and a method for manufacturing a secondary battery that can reduce the likelihood of damaging a plurality of stacked sheets of metal foil when the plurality of stacked sheets of metal foil and a metal member are ultrasonically bonded, without using a protective metal plate.

DESCRIPTION OF EMBODIMENTS

Hereinafter, an ultrasonic horn according to one embodiment of the present invention and a method for manufacturing a secondary battery using this ultrasonic horn will be described.

A rectangular secondary battery manufactured by using the ultrasonic horn according to one embodiment of the present invention will be described with reference to FIG. 1 to FIG. 3. Herein, an example of applying a rectangular secondary battery 20 to a lithium ion secondary battery will be described.

Figure 1:
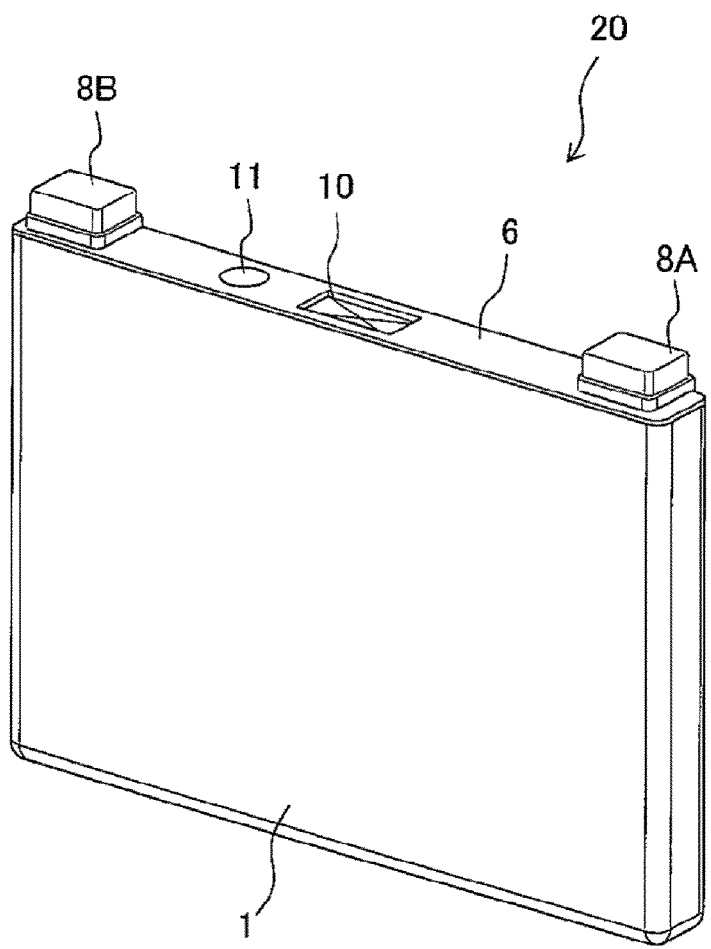
FIG. 1 is an external perspective view of a rectangular secondary battery manufactured by using an ultrasonic horn according to one embodiment of the present invention.

FIG. 1 is an external perspective view of a rectangular secondary battery manufactured by using an ultrasonic horn according to one embodiment of the present invention. FIG. 2 is an exploded perspective view of a rectangular secondary battery manufactured by using an ultrasonic horn according to one embodiment of the present invention. As shown in FIG. 1 and FIG. 2, the rectangular secondary battery 20 includes a battery case 1 and a lid 6. The battery case 1 houses an electrode group 3 serving as a power generator, and the upper opening of the battery case 1 is sealed with the lid 6. The lid 6 is welded to the battery case 1 by laser welding. The battery case 1 and the lid 6 form a battery container.

The lid 6 is provided with a positive electrode external terminal 8A and a negative electrode external terminal 8B. Via the positive electrode external terminal 8A and the negative electrode external terminal 8B, the electrode group 3 is charged, and electric power is supplied to an external load. The lid 6 is integrally provided with a gas discharge valve 10. When a pressure increases in the battery container, the gas discharge valve 10 opens, and gas is discharged from the inside of the battery container to reduce the pressure in the battery container, such that the safety of the rectangular secondary battery 20 is ensured. In addition, a liquid injection plug 11 is welded to the lid 6 to seal a liquid injection port 9 for injecting an electrolyte into the battery case 1.

The battery case 1 of the rectangular secondary battery 20 houses the electrode group 3 via an insulating sheet 2.

In the electrode group 3, a positive electrode body (positive electrode) 301 and a negative electrode body (negative electrode) 302 are wound about a winding axis L in a flat shape with a separator 303 (see FIG. 3 for all of them) interposed therebetween. The electrode group 3 includes a pair of bent portions 3a, 3b each having a substantially semicircular cross section that are opposed to each other, and a flat surface portion 3c continuously formed between the pair of bent portions 3a, 3b. The electrode group 3 includes a positive electrode side bundled portion 301d and a negative electrode side bundled portion 302d, which are formed by at least partially bundling in a flat plate shape a positive electrode foil-exposed portion 301c and a negative electrode foil-exposed portion 302c (see FIG. 3 for them) serving as the flat surface portion 3c of the electrode group 3 and metal-foil-exposed portions (described later). The positive electrode side bundled portion 301d and the negative electrode side bundled portion 302d are respectively overlaid with and connected to one end (connection portion 42A) of a positive electrode collector plate 4A and one end (connection portion 42B) of a negative electrode collector plate 4B by welding or the like. The positive electrode collector plate 4A and the negative electrode collector plate 4B are one example of the "metal member" of the present invention. The electrode group 3 is inserted into the battery case 1 from the bent portion 3b, which is one of the pair of bent portions 3a, 3b, such that the winding axis L direction of the electrode group 3 is along the lateral width of the battery case 1, and the bent portion 3a, which is the other one of the pair of bent portions 3a, 3b, is disposed so as to be adjacent to an upper opening 1a of the battery case 1.

The other end (upper end) of the positive electrode collector plate 4A and the other end (upper end) of the negative electrode collector plate 4B are connected to the positive electrode external terminal 8A and the negative electrode external terminal 8B, respectively. In addition, the positive electrode external terminal 8A and the negative electrode external terminal 8B each have a weld joint part to be joined by welding to a bus bar or the like (not shown). The weld joint part has a rectangular parallelepiped block shape protruding upward from the lid 6, and is configured such that the lower surface thereof faces the surface of the lid 6, and the upper surface thereof is in parallel with the lid 6 at a predetermined height position.

A positive electrode connection portion 12A for connecting the positive electrode external terminal 8A and the positive electrode collector plate 4A is integrally formed with the lower surface of the weld joint part of the positive electrode external terminal 8A. A negative electrode connection portion 12B for connecting the negative electrode external terminal 8B and the negative electrode collector plate 4B is integrally formed with the lower surface of the weld joint part of the negative electrode external terminal 8B.

In addition, the positive electrode collector plate 4A and the negative electrode collector plate 4B respectively include rectangular plate-like base portions 41A, 41B disposed to face the lower surface of the lid 6. The base portions 41A, 41B respectively have opening holes 43A, 43B through which the positive electrode connection portion 12A formed on the positive electrode external terminal 8A and the negative electrode connection portion 12B formed on the negative electrode external terminal 8B are inserted, respectively. It should be noted that the positive electrode collector plate 4A and the negative electrode collector plate 4B are bent at the side ends of the base portions 41A, 41B and extend toward the bottom surface of the battery case 1 along the wider surface of the battery case 1. The positive electrode collector plate 4A and the negative electrode collector plate 4B respectively include connection portions 42A, 42B to be connected to the positive electrode side bundled portion 301d and the negative electrode side bundled portion 302d of the electrode group 3, respectively, in a state where the positive electrode collector plate 4A and the negative electrode collector plate 4B are opposed to and overlaid with the positive electrode side bundled portion 301$d$ and the negative electrode side bundled portion 302$d$.

The positive electrode connection portion 12A of the positive electrode external terminal 8A and the negative electrode connection portion 12B of the negative electrode external terminal 8B have a cylindrical shape such that the end of the positive electrode external terminal 8A and the end of the negative electrode external terminal 8B protruding from their respective lower surfaces can be inserted into through-holes 6A, 6B formed on the lid 6, respectively. The positive electrode connection portion 12A and the negative electrode connection portion 12B penetrate the lid 6 through the through-holes 6A, 6B, and protrude toward the inner part of the battery case 1 beyond the base portions 41A, 41B of the positive electrode collector plate 4A and the negative electrode collector plate 4B through the opening holes 43A, 43B. The positive electrode connection portion 12A and the negative electrode connection portion 12B are swaged at their ends so as to integrally fix the positive electrode external terminal 8A and the positive electrode collector plate 4A to the lid 6, and the negative electrode external terminal 8B and the negative electrode collector plate 4B to the lid 6. Here, a gasket 5 is interposed between the positive electrode external terminal 8A and the lid 6 and between the negative electrode external terminal 8B and the lid 6, and an insulating plate 7 is interposed between the positive electrode collector plate 4A and the lid 6 and between the negative electrode collector plate 4B and the lid 6. The gaskets 5 and the insulating plates 7 electrically insulate the positive electrode external terminal 8A, the negative electrode external terminal 8B, the positive electrode collector plate 4A, and the negative electrode collector plate 4B from the lid 6.

It should be noted that a liquid injection port 9 is formed on the lid 6, and after an electrolyte is injected from the liquid injection port 9 into the battery case 1, a liquid injection plug 11 is welded to the liquid injection port 9, so as to hermetically seal the rectangular secondary battery 20.

In addition, the positive electrode collector plate 4A includes a current interruption portion 101 configured to interrupt current when an excessive current flows into an intermediate portion of the positive electrode collector plate 4A. The current interruption portion 101 is formed by narrowing some portion of the positive electrode collector plate 4A, for example, and when such a portion is blown out by the excessive current, the positive electrode collector plate 4A is able to be separated into a portion adjacent to the electrode group 3 and a portion adjacent to the positive electrode external terminal 8A. It should be noted that the current interruption portion 101 may be formed on the negative electrode collector plate 4B, or may be formed on each of the positive electrode collector plate 4A and the negative electrode collector plate 4B. As long as the current interruption portion 101 can interrupt current flowing through a current collector plate when an excessive current flows, the configuration of the current interruption portion 101 is not limited to the above-described configuration.

The battery case 1, the lid 6, the positive electrode collector plate 4A, and the positive electrode external terminal 8A are made of aluminum or an aluminum alloy, and the negative electrode collector plate 4B and the negative electrode external terminal 8B are made of copper or a copper alloy.

Figure 2:
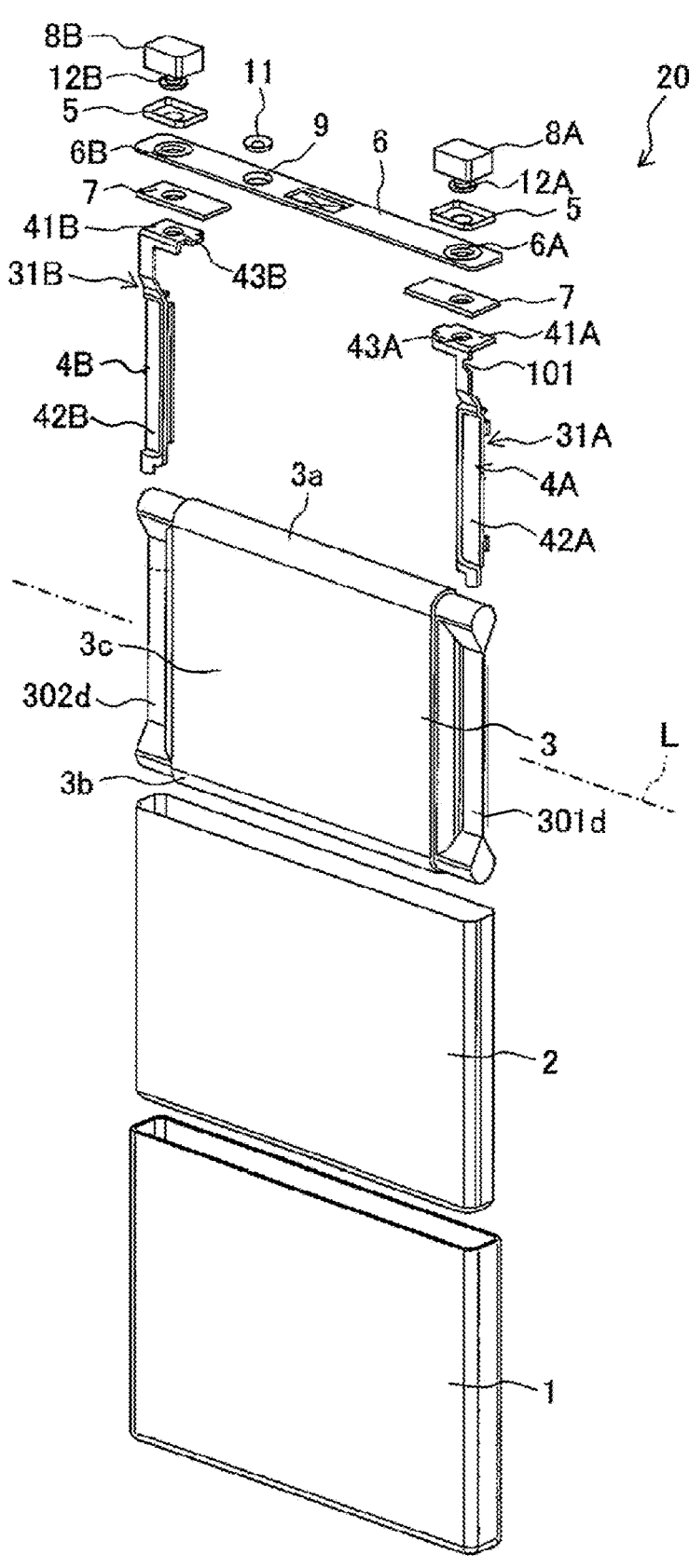
FIG. 2 is an exploded perspective view of a rectangular secondary battery manufactured by using an ultrasonic horn according to one embodiment of the present invention.
Figure 3:
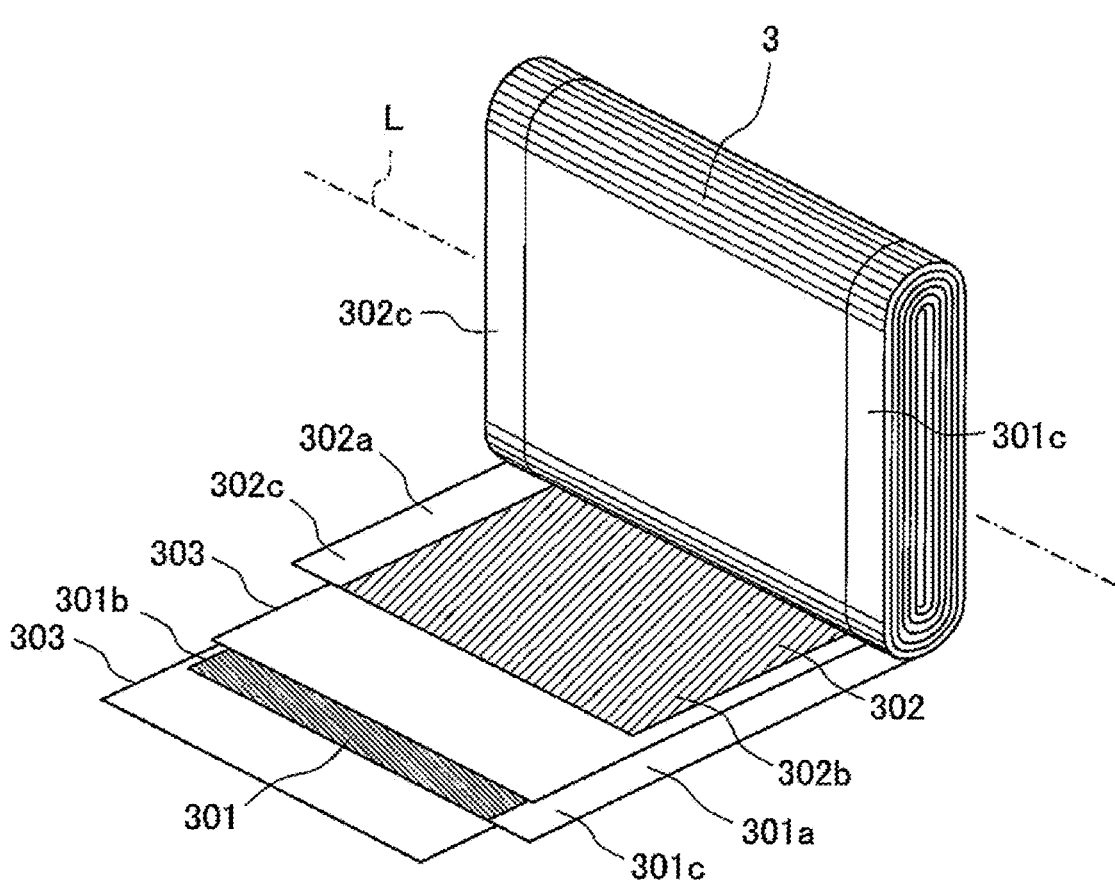
FIG. 3 is a perspective view of the electrode group shown in FIG. 2, a part of which is expanded.

FIG. 3 is a perspective view of the electrode group 3 shown in FIG. 2, a part of which is expanded. It should be noted that FIG. 3 shows a state of the electrode group 3 before the metal-foil-exposed portions (i.e., the positive electrode foil-exposed portion 301$c$, the negative electrode foil-exposed portion 302$c$) of the positive electrode body (positive electrode) 301 and the negative electrode body (negative electrode) 302 are bundled and bonded.

As shown in FIG. 3, the electrode group 3 is formed by winding in a flat shape the positive electrode body 301 and the negative electrode body 302 about the winding axis L with the separator 303 interposed therebetween. Here, the positive electrode body 301 includes an active material layer that is formed by applying a positive electrode mixture 301$b$ on both surfaces of a positive electrode foil (metal foil) 301$a$, and the end portion of the positive electrode foil 301$a$ on one side in the width direction (i.e., winding axis L direction) includes the positive electrode foil-exposed portion (metal-foil-exposed portion) 301$c$ on which the positive electrode mixture 301$b$ is not applied and the positive electrode foil 301$a$ is exposed. The negative electrode body 302 includes an active material layer that is formed by applying a negative electrode mixture 302$b$ on both surfaces of a negative electrode foil (metal foil) 302$a$, and the end portion of the negative electrode foil 302$a$ on the other side in the width direction (i.e., winding axis L direction) includes the negative electrode foil-exposed portion (metal-foil-exposed portion) 302$c$ on which the negative electrode mixture 302$b$ is not applied and the negative electrode foil 302$a$ is exposed. The positive electrode body 301 and the negative electrode body 302 are wound about the winding axis L such that the positive electrode foil-exposed portion 301$c$ and the negative electrode foil-exposed portion 302$c$ are disposed on opposite sides to each other in the winding axis L direction.

Hereinafter, a method for manufacturing the electrode bodies 301, 302 will be described. For the negative electrode body 302, PolyVinylidene Difluoride (PVDF) as a binder is added to amorphous carbon powder with a mass ratio of amorphous carbon powder to PVDF of 10:1, and N-methylpyrrolidone (NMP) as a dispersing solvent is further added and kneaded to prepare the negative electrode mixture 302$b$. The negative electrode mixture 302$b$ is applied to both surfaces of a copper foil (negative electrode foil 302$a$) having a thickness of 10 μm, with a current collector portion (i.e., negative electrode foil-exposed portion 302$c$) left. Then, after drying, pressing, and cutting steps, the negative electrode body 302 having a thickness of 70 μm excluding the copper foil is obtained.

It should be noted that although an example using the amorphous carbon for the negative electrode mixture 302$b$ has been described in the present embodiment, examples of the negative electrode mixture may include natural graphite into/from which lithium ions can be insert/removed, various artificial graphite materials, a carbonaceous material such as coke, or the like. Examples of the particle form thereof may include a scaly form, a spherical form, a fibrous form, a massive form, or the like.

For the positive electrode body 301, scaly graphite as a conductive material and PVDF as a binder are added to lithium manganese oxide ($LiMn_2O_4$) with a mass ratio of $LiMn_2O_4$ to scaly graphite to PVDF of 10:1:1, and the NMP as a dispersing solvent is further added and kneaded to prepare the positive electrode mixture 301$b$. The positive electrode mixture 301$b$ is applied to both surfaces of an aluminum foil (positive electrode foil 301$a$) having a thickness of 20 μm, with a current collector portion (i.e., positive electrode foil-exposed portion 301$c$) left. Then, after drying, pressing, and cutting steps, the positive electrode body 301 having a thickness of 90 μm excluding the aluminum foil is obtained.

It should be noted that although an example using the lithium manganese oxide for the positive electrode mixture 301b has been described in the present embodiment, examples of the positive electrode mixture may include another lithium manganese oxide having a spinel crystal structure, a lithium manganese composite oxide in which the lithium manganese oxide is partially substituted by or doped with a metal element, a lithium cobaltite or a lithium titanate having a layered crystal structure, or a lithium-metal composite oxide in which the lithium cobaltite or lithium titanate is partially substituted by or doped with a metal element.

Also, although an example using PVDF as a binder for the coating portions in the positive electrode body 301 and the negative electrode body 302 has been described in the present embodiment, examples of the binder may include a polymer, a mixture, and the like of polytetrafluoroethylene, polyethylene, polystyrene, polybutadiene, butyl rubber, nitrile rubber, styrene butadiene rubber, polysulfide rubber, nitrocellulose, cyanoethyl cellulose, various kinds of latex, acrylonitrile, vinyl fluoride, vinylidene fluoride, propylene fluoride, chloroprene fluoride, acrylic-based resin, and the like.

Figure 4:
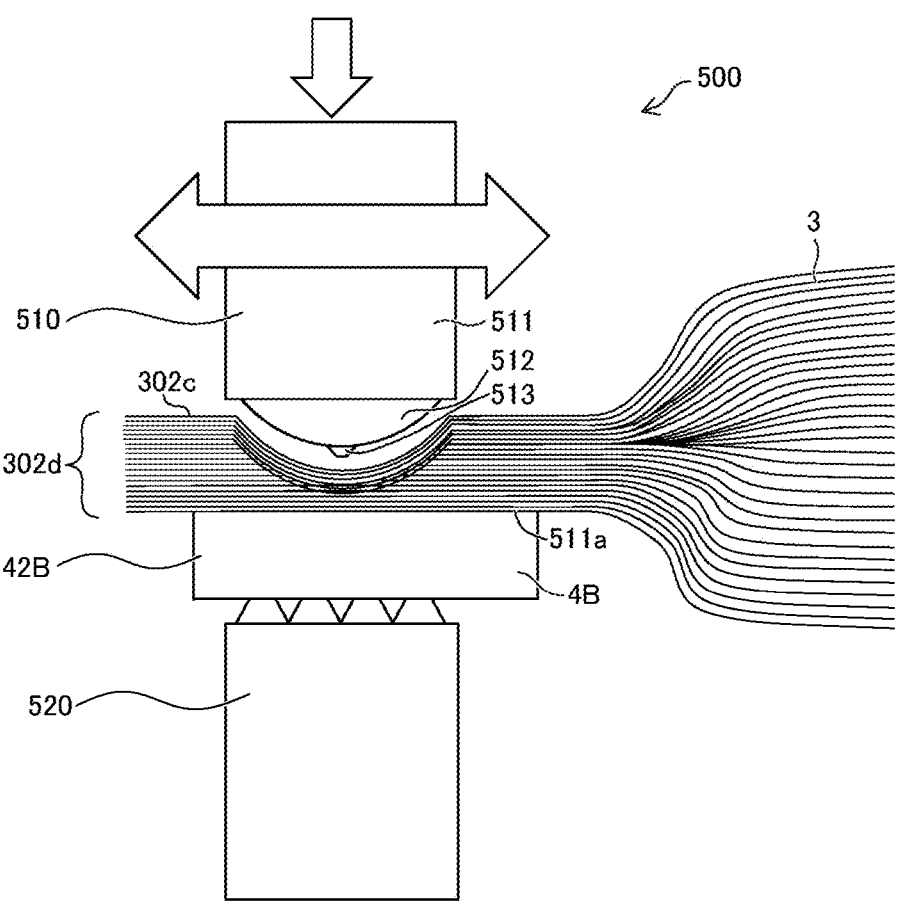
FIG. 4 is a view schematically showing the step of bonding a current collector plate to the electrode group shown in FIG. 3.

FIG. 4 is a view schematically showing the step of bonding a current collector plate to the electrode group shown in FIG. 3. Although an example of bonding the negative electrode body 302 and the negative electrode collector plate 4B will be described, the same bonding step also applies to an example of bonding the positive electrode body 301 and the positive electrode collector plate 4A. That is, the bonding step is not limited to bonding a metal foil made of copper and a current collector plate, and is also applicable to bonding a metal foil made of aluminum and a current collector plate, and further to bonding a metal foil made of material other than copper and aluminum and a current collector plate.

As shown in FIG. 4, the connection portion 42B of negative electrode collector plate 4B is disposed on one side 302e of the negative electrode side bundled portion 302d that is formed by bundling the negative electrode foil-exposed portion 302c of the electrode group 3 in a flat plate shape, and then through ultrasonic bonding, the negative electrode foil-exposed portion 302c of the electrode group 3 and the connection portion 42B of the negative electrode collector plate 4B are bonded together in a state where their respective flat surface portions abut on each other.

Specifically, an ultrasonic bonding apparatus 500 for bonding the negative electrode foil-exposed portion 302c and the connection portion 42B of the negative electrode collector plate 4B includes a horn (ultrasonic horn) 510, an anvil 520 disposed to face the horn 510, and a horn drive unit (not shown) for driving the horn 510.

The connection portion 42B of the negative electrode collector plate 4B is disposed on the anvil 520 of the ultrasonic bonding apparatus 500, and the negative electrode foil-exposed portion 302c is disposed on the connection portion 42B. Then, in a state where the horn 510 and the anvil 520 sandwich therebetween the negative electrode side bundled portion 302d of the negative electrode foil-exposed portion 302c and the connection portion 42B, the horn 510 is ultrasonically vibrated while being pressed against the negative electrode side bundled portion 302d. This removes an oxide film on the surface of the connection portion 42B and the negative electrode foil-exposed portion 302c and facilitates atomic diffusion with frictional heat generated by the vibration, whereby the connection portion 42B and the negative electrode foil-exposed portion 302c are ultrasonically bonded.

Figure 5:
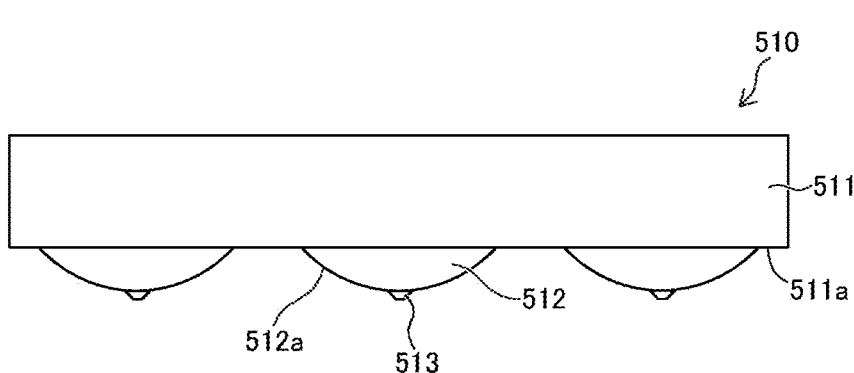
FIG. 5 is a view showing a first protrusion and a second protrusion of the ultrasonic horn according to one embodiment of the present invention.
Figure 6:
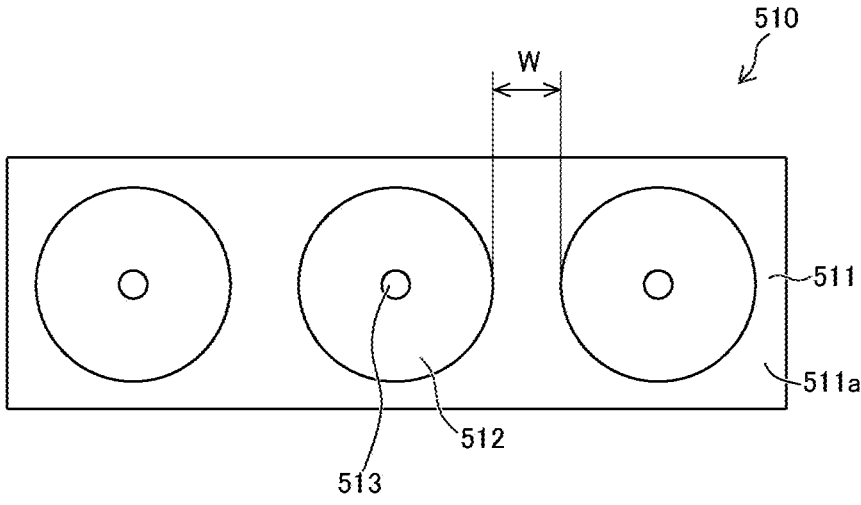
FIG. 6 is a side view showing the first protrusion and the second protrusion of the ultrasonic horn according to one embodiment of the present invention.

Herein, in the present embodiment, as shown in FIG. 5 and FIG. 6, the horn 510 includes a horn body 511 in a substantially rectangular parallelepiped, a first protrusion 512 that protrudes from an opposing surface 511a of the horn body 511, which is a flat surface facing the anvil 520, toward the anvil 520 (see FIG. 4), and a second protrusion 513 that is provided at the center (i.e., the furthest portion from the horn body 511) of a first surface 512a of the first protrusion 512 and protrudes toward the anvil 520. In the present embodiment, mainly a plurality of (e.g., three in this example) first protrusions 512 is provided and arranged on a straight line in a direction perpendicular to the paper surface of FIG. 4, that is, in a longitudinal direction of the negative electrode collector plate 4B shown in FIG. 2. Providing the plurality of first protrusions 512 allows the negative electrode foil-exposed portion 302c and the negative electrode collector plate 4B to be bonded together at a plurality of positions, thereby increasing the reliability of connection between the negative electrode foil-exposed portion 302c and the negative electrode collector plate 4B in the long view. Although the horn body 511 includes three first protrusions 512 in the present embodiment, the number of first protrusions 512 is not particularly limited. As can be seen from Example 8, which will be described later, providing only one first protrusion 512 can increase the connection reliability, and at least one first protrusion 512 is simply required. It should be noted that examples of the material of the horn 510 may include, but not particularly limited to, an aluminum alloy or a titanium alloy. Examples of a method for manufacturing the horn 510 may include, but not particularly limited to, sintering or casting. Although the horn body 511, the first protrusion 512, and the second protrusion 513 are integrally formed, the first protrusion 512 and the second protrusion 513 may be integrally formed and then fixed to the horn body 511.

Figure 7:
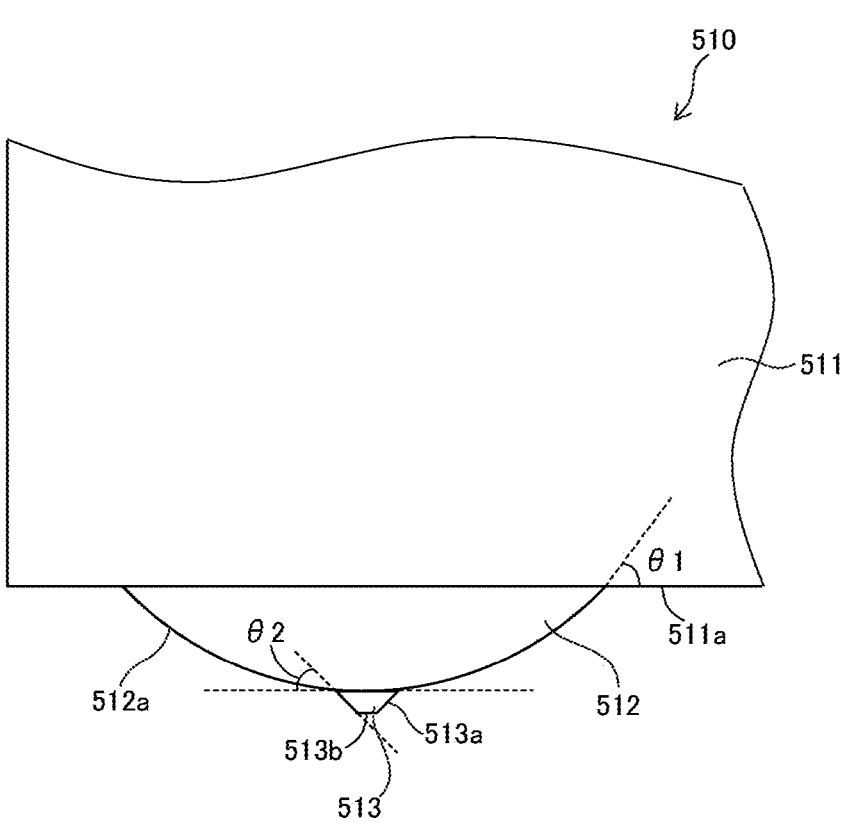
FIG. 7 is an enlarged view showing the first protrusion and the second protrusion of the ultrasonic horn according to one embodiment of the present invention.

As shown in FIG. 4 and FIG. 7, the first protrusion 512 is formed of a part of a sphere. The first surface 512a of the first protrusion 512 is a curved surface, which is a part of the spherical surface in this example. When the negative electrode foil-exposed portion 302c and the negative electrode collector plate 4B are bonded together, the first surface 512a of the first protrusion 512 and the anvil 520 sandwich therebetween the negative electrode side bundled portion 302d and the negative electrode collector plate 4B to press the negative electrode side bundled portion 302d. This brings the stacked sheets of negative electrode foil-exposed portion 302c in tight contact with each other without a gap therebetween.

In the boundary portion between the first surface 512a of the first protrusion 512 and the opposing surface 511a of the horn body 511, an angle $\theta 1$ defined by the first surface 512a and the opposing surface 511a may be, but not particularly limited to, 60° or less, specifically, 30° or less. This is because, as the angle $\theta 1$ decreases, a force in vibration directions (i.e., right-and-left directions in FIG. 4) to be applied to the negative electrode foil-exposed portion 302c decreases when the horn 510 is vibrated, and the likelihood of damaging the negative electrode foil-exposed portion 302c can be reduced.

In addition, the angle $\theta 1$ may be 5° or greater. As the angle $\theta 1$ is closer to 0°, a force to be applied from the first protrusion 512 to the negative electrode foil-exposed portion 302c is distributed. Then, a force to be applied to a portion of the negative electrode foil-exposed portion 302c adjacent to the second protrusion 513 decreases, thereby reducing the tight contact between the stacked sheets of negative electrode foil-exposed portion 302c. For this reason, setting the angle $\theta 1$ to 5° or greater can easily ensure the tight contact between the stacked sheets of negative electrode foil-exposed portion 302c.

The second protrusion 513 is formed of a part of a truncated cone. The second protrusion 512 includes an end surface (i.e., the lower surface in FIG. 7) 513b, which is a planar surface disposed in the furthest position from the horn body 511, and a second surface 513a connecting the end surface 513b and the first surface 512a of the first protrusion 512. The second surface 512a is a curved surface and is formed of a part of the conical surface. When the negative electrode foil-exposed portion 302c and the negative electrode collector plate 4B are bonded together, the second protrusion 513 ultrasonically vibrates while pressing the negative electrode foil-exposed portion 302c, whereby the stacked sheets of negative electrode foil-exposed portion 302c are firmly bonded together, and also the negative electrode foil-exposed portion 302c and the negative electrode collector plate 4B are firmly bonded together.

In the boundary portion between the second surface 513a of the second protrusion 513 and the first surface 512a of the first protrusion 512, an angle $\theta 2$ of the second surface 513a with respect to the opposing surface 511a may be, but not particularly limited to, 60° or less, specifically, 35° or less. This is because, as the angle $\theta 2$ decreases, a force in vibration directions (i.e., right-and-left directions in FIG. 4) to be applied to the negative electrode foil-exposed portion 302c decreases when the horn 510 is vibrated, and the likelihood of damaging the negative electrode foil-exposed portion 302c can be reduced.

In addition, the angle $\theta 2$ may be 15° or greater. In order to provide the second protrusion 513 on the first surface 512a, which is formed of a part of the spherical surface, the second surface 513a needs to have an inclination angle greater than that of the first surface 512a. Setting the angle $\theta 2$ to 15° or greater can easily form the second protrusion 513 so as to protrude downward relative to the first surface 512a, which is formed of a part of the spherical surface.

The end surface 513b, which is a planar surface, is formed so as to be in parallel with the opposing surface 511a of the horn body 511 and the vibration directions of the horn 510. When the negative electrode foil-exposed portion 302c and the negative electrode collector plate 4B are bonded together, the end surface 513b can prevent the force to be applied from the end surface 513b to the negative electrode foil-exposed portion 302c from concentrating on one point. Since shearing stress generated in the negative electrode foil-exposed portion 302c will not concentrate on one point, the likelihood of damaging the negative electrode foil-exposed portion 302c can be reduced.

Figure 8:
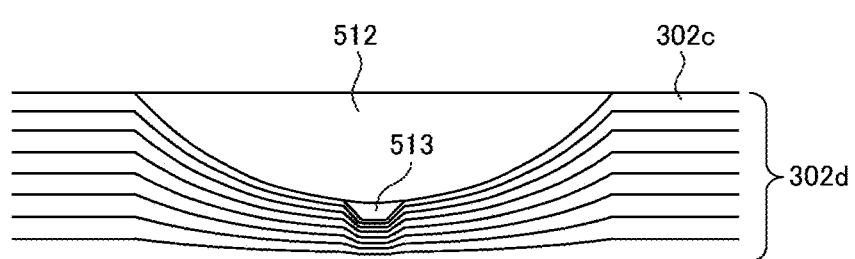
FIG. 8 is a cross-sectional view showing a negative electrode side bundled portion being pressed by the ultrasonic horn according to one embodiment of the present invention.
Figure 9:
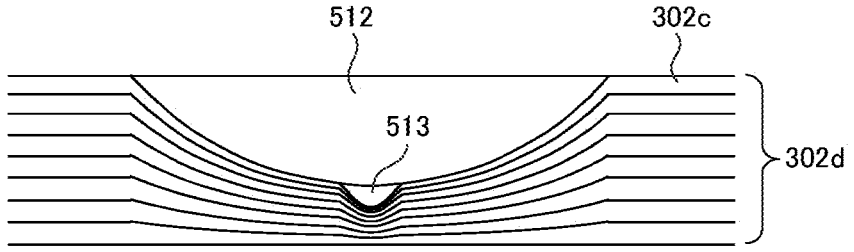
FIG. 9 is a cross-sectional view showing a negative electrode foil-exposed portion being pressed by the ultrasonic horn, which includes a hemispherical end of the second protrusion instead of a planar end, unlike one embodiment of the present invention.

In addition, when the negative electrode side bundled portion 302d is pressed by the horn 510, as shown in FIG. 8, the upper sheet of the negative electrode foil-exposed portion 302c (i.e., the negative electrode foil-exposed portion 302c adjacent to the horn 510) among the plurality of sheets of negative electrode foil-exposed portion 302c has a larger deformation amount, and the uppermost sheet of the negative electrode foil-exposed portion 302c among the plurality of sheets of negative electrode foil-exposed portion 302c has the largest deformation amount. Thus, in the portion being pressed by the horn 510, the uppermost sheet of the negative electrode foil-exposed portion 302c has the smallest thickness. In addition, along with the deformation, the negative electrode foil-exposed portion 302c adjacent to the horn 510 has a smaller thickness, and the portion being pressed by the end surface 513b has the smallest thickness. That is, the portion of the uppermost sheet of the negative electrode foil-exposed portion 302c being pressed by the end surface 513b has the smallest thickness. FIG. 9 is a cross-sectional view showing the negative electrode foil-exposed portion 302c being pressed by the horn, which includes a hemispherical end of the second protrusion 513 instead of a planar end, unlike the one in the present embodiment. When the end of the second protrusion 513 is formed in a hemispherical shape as shown in FIG. 9 or a pointed shape (not shown), for example, the portion of the negative electrode foil-exposed portion 302c being pressed by the end of the second protrusion 513 will have a much smaller thickness since it has a much larger deformation amount as compared to the case where the portion of the negative electrode foil-exposed portion 302c is pressed by the end surface 513b of the present embodiment. Therefore, it is more likely that applying ultrasonic vibration to the negative electrode foil-exposed portion 302c by using the second protrusion 513 having a hemispherical end shown in FIG. 9 or a pointed end (not shown) will damage the negative electrode foil-exposed portion 302c, as compared to the case of applying ultrasonic vibration to the negative electrode foil-exposed portion 302c by using the second protrusion 513 including the end surface 513b of the present embodiment. It should be noted that if the second protrusion 513 formed in a pointed shape (not shown) is used, the negative electrode foil-exposed portion 302c may be damaged at a point when the negative electrode foil-exposed portion 302c is pressed.

The area of the end surface 513b may be, but not particularly limited to, 0.05 mm² or larger and 1.15 mm² or smaller. Setting the area of the end surface 513b to 0.05 mm² or larger can distribute the force to be applied from the second protrusion 513 to the negative electrode foil-exposed portion 302c when the negative electrode foil-exposed portion 302c and the negative electrode collector plate 4B are bonded together, and thus the likelihood of damaging the negative electrode foil-exposed portion 302c can easily be reduced. Setting the area of the end surface 513b to 1.15 mm² or smaller can ensure a sufficient pressure required for removing an oxide film on the surface of the negative electrode foil-exposed portion 302c and the surface of the connection portion 42B even when the force to be applied from the end surface 513b to the negative electrode foil-exposed portion 302c is distributed. Therefore, the likelihood of causing the oxide film to be partially left on the surface of the negative electrode foil-exposed portion 302c and the surface of the connection portion 42B can easily be reduced.

In addition, a plurality of (e.g., three in this example) first protrusions 512 is disposed at predetermined intervals (for example, 0.3 mm or larger). The interval W (see FIG. 6) between the adjacent first protrusions 512 may be, but not particularly limited to, 0.3 mm or larger. This is because when the first protrusions 512 are pressed against the negative electrode side bundled portion 302d, the first protrusions 512 cause the negative electrode foil-exposed portion 302c to deform. At this time, the negative electrode foil-exposed portion 302c is pressed in the lateral direction (i.e., the horizontal direction in FIG. 5) by the first protrusions 512. When the interval W between the adjacent first protrusions 512 is small, the negative electrode foil-exposed portion 302c has no clearance between the adjacent first protrusions 512, thus leading to wrinkling in the negative electrode foil-exposed portion 302c. For this reason, the interval W may be 0.3 mm or larger.

It should be noted that the distance from the opposing surface 511a of the horn body 511 to the end surface 513b of the second protrusion 513 may be set within, but not particularly limited to, a range of −0.1 mm to +0.3 mm, for example, with respect to a value (i.e., the total thickness of the sheets of negative electrode foil-exposed portion 302c) obtained by multiplying the thickness of the negative electrode foil-exposed portion 302c (e.g., 10 μm in this example) by the number of sheets of negative electrode foil-exposed portion 302c to be stacked (70, for example).

In the present embodiment, as described above, the horn body 511 is provided with the first protrusion 512 including the first surface 512a that is a curved surface, and the first surface 512a of the first protrusion 512 is provided with the second protrusion 513. With such a configuration, when the negative electrode foil-exposed portion 302c and the connection portion 42B are bonded together by the second protrusion 513, the first protrusion 512 pressurizes the negative electrode foil-exposed portion 302c, whereby the stacked sheets of negative electrode foil-exposed portion 302c come into tight contact with each other in the vicinity of the second protrusion 513 and the likelihood of generating a gap therebetween can be reduced. Therefore, when the second protrusion 513 vibrates while pressurizing the negative electrode foil-exposed portion 302c and the connection portion 42B, friction is generated between the surface of the connection portion 42B and the surface of the negative electrode foil-exposed portion 302c in a state where they are uniformly in tight contact by the second protrusion 513. This makes it easier to remove the oxide film on the surface of the connection portion 42B and the surface of the negative electrode foil-exposed portion 302c between the first protrusion 512 and the anvil 520, and facilitates atomic diffusion with frictional heat, and thus the adjacent sheets of negative electrode foil-exposed portion 302c can be favorably bonded together and the negative electrode foil-exposed portion 302c and the connection portion 42B can be favorably bonded together.

Furthermore, the second protrusion 513 is provided with the end surface 513b that is a planar surface. With such a configuration, the force to be applied from the end surface 513b to the negative electrode foil-exposed portion 302c will not concentrate on one point when the negative electrode foil-exposed portion 302c and the connection portion 42B are bonded together. Since stress will not concentrate on one point when the negative electrode foil-exposed portion 302c and the connection portion 42B are bonded together, the likelihood of damaging the negative electrode foil-exposed portion 302c can be reduced.

Moreover, since the second protrusion 513 is provided with the end surface 513b that is a planar surface, it is possible to suppress a decrease in the thickness of the portion of the upper sheet of the negative electrode foil-exposed portion 302c being pressed by the second protrusion 513 when the second protrusion 513 presses the plurality of sheets of negative electrode foil-exposed portion 302c, as compared to the case where the end of the second protrusion 513 is formed in a hemispherical shape or a pointed shape. Therefore, the likelihood of damaging the negative electrode foil-exposed portion 302c when ultrasonic vibration is applied to the negative electrode foil-exposed portion 302c can be reduced.

In addition, the angle θ1 of the first protrusion 512 is 5° or greater and 30° or less as described above. Thus, the angle θ1 of the first protrusion 512 is set to 30° or less. This sufficiently reduces the force in the vibration directions (i.e., right-and-left directions in FIG. 4) to be applied from the first protrusion 512 to the negative electrode foil-exposed portion 302c when the horn 510 is vibrated. With such a configuration, it is possible to sufficiently reduce the likelihood of damaging the negative electrode foil-exposed portion 302c. In addition, the angle θ1 of the first protrusion 512 is set to 5° or greater. This can prevent excessive distribution of the force to be applied from the first protrusion 512 to the negative electrode foil-exposed portion 302c, and sufficiently pressurize the portion of the negative electrode foil-exposed portion 302c in the vicinity of the second protrusion 51. Therefore, a tight contact between the stacked sheets of negative electrode foil-exposed portion 302c can be sufficiently ensured.

In addition, the angle θ2 of the second protrusion 513 is 35° or less as described above. This sufficiently reduces the force in the vibration directions (i.e., right-and-left directions in FIG. 4) to be applied from the second protrusion 513 to the negative electrode foil-exposed portion 302c when the horn 510 is vibrated. Therefore, the likelihood of damaging the negative electrode foil-exposed portion 302c can be sufficiently reduced.

In addition, the area of the end surface 513b of the second protrusion 513 is 0.05 mm$^2$ or larger as described above. This sufficiently distributes the force to be applied from the end surface 513b to the negative electrode foil-exposed portion 302c when the negative electrode foil-exposed portion 302c and the connection portion 42B are bonded together. Since the stress generated in the negative electrode foil-exposed portion 302c can be sufficiently distributed, the likelihood of damaging the negative electrode foil-exposed portion 302c can be reduced. Furthermore, the area of the end surface 513b is 1.15 mm$^2$ or smaller. With such a configuration, it is possible to ensure a sufficient pressure required for removing an oxide film on the surface of the negative electrode foil-exposed portion 302c and the surface of the connection portion 42B even when the force to be applied from the end surface 513b to the negative electrode foil-exposed portion 302c is distributed. Therefore, it is possible to easily reduce the likelihood of causing the oxide film to be partially left on the surface of the negative electrode foil-exposed portion 302c and the surface of the connection portion 42B.

In addition, the plurality of first protrusions 512 is provided on the horn body 511 as described above. The adjacent first protrusions 512 are disposed at the interval W of 0.3 mm or larger. With such a configuration, when the first protrusions 512 are pressed against the negative electrode side bundled portion 302d, a sufficient clearance is ensured for the negative electrode foil-exposed portion 302c between the adjacent first protrusions 512 even if the negative electrode foil-exposed portion 302c is pressed by the first protrusions 512 in the lateral direction. This can reduce occurrence of wrinkling in the negative electrode foil-exposed portion 302c.

Next, a confirmation experiment that was conducted to confirm the effects of the present embodiment will be described. First, an experiment to confirm the effects of providing both of the first protrusion 512 and the second protrusion 513 on the horn 510 will be described.

Example 1

In Example 1, by using the horn 510 having three first protrusions 512 on the horn body 511, the negative electrode side bundled portion 302d including a bundle of the negative electrode foil-exposed portion 302c and the connection portion 42B of the negative electrode collector plate 4B were bonded together. The angle θ1 of the first protrusion 512 was 60° and the angle θ2 of the second protrusion 513 was 60°. The area of each end surface 513b of the second

13 protrusion 513 was 0.15 mm². The interval W between the adjacent first protrusions 512 was 2.8 mm. The other configurations were equal to those of the above embodiment.

Example 2

In Example 2, the angle θ1 was 45° and the angle θ2 was 60°. The other configurations were equal to those of Example 1.

Example 3

In Example 3, the angle θ1 was 30° and the angle θ2 was 45°. The other configurations were equal to those of Example 1.

Example 4

In Example 4, the angle θ1 was 30° and the angle θ2 was 35°. The other configurations were equal to those of Example 1.

Example 5

In Example 5, the angle θ1 was 30° and the angle θ2 was 15°. The other configurations were equal to those of Example 1.

Example 6

In Example 6, the angle θ1 was 5° and the angle θ2 was 35°. The other configurations were equal to those of Example 1.

Example 7

In Example 7, the angle θ1 was 5° and the angle θ2 was 15°. The other configurations were equal to those of Example 1.

Comparative Example 1

In Comparative Example 1, three first protrusions 512 were provided on the horn body 511, and no second protrusion 513 was provided. The angle θ1 was 60°. The other configurations were equal to those of Example 1.

Comparative Example 2

In Comparative Example 2, the angle θ1 was 45°. The other configurations were equal to those of Comparative Example 1.

Comparative Example 3

In Comparative Example 3, the angle θ1 was 30°. The other configurations were equal to those of Comparative Example 1.

Comparative Example 4

In Comparative Example 4, three first protrusions were provided on the horn body 511, and no second protrusion was provided. The first protrusion of Comparative Example 4 had a shape of a quadrangular pyramid having a pointed tip toward the negative electrode foil-exposed portion 302c, unlike the aforementioned first protrusion 512. The angle θ1 defined by the side face of the first protrusion and the opposing surface 511a of the horn body 511 was 45°. The other configurations were equal to those of Example 1.

Comparative Example 5

In Comparative Example 5, in the same manner as the aforementioned Patent Literature 1, the connection portion 42B of the negative electrode collector plate 4B and the negative electrode side bundled portion 302d were disposed above the anvil 520, and then a protective material made of metal was disposed on the negative electrode side bundled portion 302d, and the connection portion 42B and the negative electrode side bundled portion 302d were bonded together by using the same horn 510 as the one in Comparative Example 4. The other configurations were equal to those of Comparative Example 4.

Then, the bonding states in Examples 1 to 7 and Comparative Examples 1 to 5 were confirmed. It should be noted that the bonding conditions included: the frequency of the horn 510 of 20 kHz, the bonding time in a range of 0.1 to 1.5 msec; the welding pressure of the horn 510 in a range of 400 to 3000N; and the amplitude amount of the horn 510 in a range of 30 to 70 µm. The most favorable conditions for each of Examples 1 to 7 and Comparative Examples 1 to 5 were found. Then, the bonding state through the bonding under the most favorable conditions for each of Examples 1 to 7 and Comparative Examples 1 to 5 was confirmed. The results are shown in Table 1 below.

It should be noted that "Excellent" shows that the negative electrode foil-exposed portion 302c was favorably bonded without having a damage such as a crack. "Good" shows that the negative electrode foil-exposed portion 302c had only a small crack or break and had only a small amount of metal powder. "Fair" shows that the negative electrode foil-exposed portion 302c had a large crack or break and had a large amount of metal powder. "Poor" shows that the negative electrode foil-exposed portion 302c and the connection portion 42B were not bonded together.

TABLE 1

| | | Angle (°) | | |
|---|---|---|---|---|
| | Protective material | First protrusion | Second protrusion | Bonding state |
| Example 1 | No | 60 | 60 | Good |
| Example 2 | No | 45 | 60 | Good |
| Example 3 | No | 30 | 45 | Good |
| Example 4 | No | 30 | 35 | Excellent |
| Example 5 | No | 30 | 15 | Excellent |
| Example 6 | No | 5 | 35 | Excellent |
| Example 7 | No | 5 | 15 | Excellent |
| Comparative Example 1 | No | 60 | — | Poor |
| Comparative Example 2 | No | 45 | — | Poor |
| Comparative Example 3 | No | 30 | — | Poor |
| Comparative Example 4 | No | 45 | — | Fair |
| Comparative Example 5 | Yes | 45 | — | Good |

With reference to Table 1, in Examples 1 to 3, unlike Comparative Examples 1 to 4, it was found that although the negative electrode foil-exposed portion 302c had a small crack or break and had a small amount of metal powder, it was favorably bonded. In Examples 4 to 7, it was found that the negative electrode foil-exposed portion 302c was favorably bonded without having a damage such as a crack.

As described above, in Examples 1 to 7, it is considered that the negative electrode foil-exposed portion 302c and the connection portion 42B were able to be favorably bonded together for the following reasons. By pressurizing the negative electrode foil-exposed portion 302*c* by the first protrusion 512, the stacked sheets of negative electrode foil-exposed portion 302*c* came into tight contact with each other and it was possible to reduce the likelihood of generating a gap therebetween. Therefore, when the second protrusion 513 vibrated while pressurizing the negative electrode foil-exposed portion 302*c* and the connection portion 42B, friction was generated between the surface of the connection portion 42B and the surface of the negative electrode foil-exposed portion 302*c* in a state where they were in tight contact. This made it easier to remove the oxide film on the surface of the connection portion 42B and the surface of the negative electrode foil-exposed portion 302*c*, and facilitated atomic diffusion with frictional heat, and thus it is considered that the negative electrode foil-exposed portion 302*c* and the connection portion 42B were able to be favorably bonded together.

In addition, as in Examples 4 to 7, the negative electrode foil-exposed portion 302*c* was favorably bonded without having a damage such as a crack by setting the angle θ1 of the first protrusion 512 to 5° or greater and 30° or less and by setting the angle θ2 of the second protrusion 513 to 15° or greater and 35° or less. It is considered that this is because of the following reasons. Setting the angle θ1 to 30° or less reduced the force in the vibration directions (i.e., right-and-left directions in FIG. 4) applied from the first protrusion 512 to the negative electrode foil-exposed portion 302*c* when the horn 510 was vibrated, and thus it was possible to prevent damaging of the negative electrode foil-exposed portion 302*c*. By setting the angle θ1 to 5° or greater, it was possible to sufficiently ensure the tight contact between the stacked sheets of negative electrode foil-exposed portion 302*c*. Setting the angle θ2 to 35° or less reduced the force in the vibration directions (i.e., right-and-left directions in FIG. 4) applied from the second protrusion 513 to the negative electrode foil-exposed portion 302*c* when the horn 510 was vibrated, and thus it was possible to prevent damaging of the negative electrode foil-exposed portion 302*c*.

In Comparative Examples 1 to 3, it was found that the negative electrode foil-exposed portion 302*c* and the connection portion 42B were not bonded together. This is because since the first surface 512*a* of the first protrusion 512 was formed by a part of the spherical surface, the force applied to the negative electrode foil-exposed portion 302*c* was distributed. It is considered that this made it impossible to remove the oxide film on the surface of the negative electrode foil-exposed portion 302*c* and the surface of the connection portion 42B, and thus the negative electrode foil-exposed portion 302*c* and the connection portion 42B were not able to be bonded together.

In Comparative Example 4, it was found that the negative electrode foil-exposed portion 302*c* had a large crack or break and had a large amount of metal powder. It is considered that this is because since the end of the first protrusion provided on the horn body 511 was pointed, the force applied to the negative electrode foil-exposed portion 302*c* was excessively concentrated, and this led to a large crack or break in the negative electrode foil-exposed portion 302*c*.

In Comparative Example 5, it was found that the negative electrode foil-exposed portion 302*c* was bonded with a reduced damage such as a crack. In Comparative Example 5, however, the negative electrode foil-exposed portion 302*c* had a damage that was larger than that in Examples 4 to 7. In addition, in Comparative Example 5, since a protective material was disposed on the anvil 520 as in the aforementioned Patent Literature 1, the number of components and the number of manufacturing steps increased.

Next, an experiment to confirm the relation between the area of the end surface 513*b* of the second protrusion 513 and the bonding state will be described.

Example 8

In Example 8, one first protrusion 512 was provided on the horn body 511, the area of the end surface 513*b* of the second protrusion 513 was 0.05 mm$^2$. The other configurations were equal to those of Example 4.

Example 9

In Example 9, the area of the end surface 513*b* of the second protrusion 513 was 0.29 mm$^2$. The other configurations were equal to those of Example 4.

Example 10

In Example 10, the area of the end surface 513*b* of the second protrusion 513 was 1.15 mm$^2$. The other configurations were equal to those of Example 4.

Example 11

In Example 11, the area of the end surface 513*b* of the second protrusion 513 was 2.36 mm$^2$. The other configurations were equal to those of Example 4.

Comparative Example 6

In Comparative Example 6, the area of the end surface 513*b* of the second protrusion 513 was 0.00 mm$^2$. That is, no end surface 513*b* was provided on the second protrusion 513. The other configurations were equal to those of Example 4.

Then, the bonding states in Examples 4, 8 to 11 and Comparative Example 6 were confirmed. It should be noted that the bonding conditions and the determination conditions were equal to those of the confirmation experiment for the bonding states in the aforementioned Examples 1 to 7 and Comparative Examples 1 to 5.

TABLE 2

| | Angle (°) | | | Second | |
| | First protrusion | Second protrusion | Number of protrusions | protrusion End area (mm$^2$) | Bonding state |
| --- | --- | --- | --- | --- | --- |
| Example 4 | 30 | 35 | 3 | 0.15 | Excellent |
| Example 8 | 30 | 35 | 1 | 0.05 | Excellent |
| Example 9 | 30 | 35 | 3 | 0.29 | Excellent |
| Example 10 | 30 | 35 | 3 | 1.15 | Excellent |

TABLE 2-continued

| | Angle (°) | | | Second | |
| | First protrusion | Second protrusion | Number of protrusions | protrusion End area (mm²) | Bonding state |
|---|---|---|---|---|---|
| Example 11 | 30 | 35 | 3 | 2.36 | Good (Some part had oxide film.) |
| Comparative Example 6 | 30 | 35 | 3 | 0.00 | Fair |

With reference to Table 2, in Examples 4, 8 to 11, it was found that the negative electrode foil-exposed portion 302c was favorably bonded without having a damage such as a crack. It is considered that this is because of the following reasons. Providing the end surface 513b that was a planar surface on the second protrusion 513 prevented the force applied from the end surface 513b to the negative electrode foil-exposed portion 302c from concentrating on one point when the negative electrode foil-exposed portion 302c and the negative electrode collector plate 4B were bonded together. Therefore, it is considered that it was possible to easily reduce the likelihood of damaging the negative electrode foil-exposed portion 302c when the negative electrode foil-exposed portion 302c and the connection portion 42B were bonded together.

It should be noted that in Example 11, an oxide film was left in a very small part of the interface between the connection portion 42B and the negative electrode foil-exposed portion 302c. It is considered that this is because setting the area of the end surface 513b to 2.36 mm² distributed the force applied from the end surface 513b to the negative electrode foil-exposed portion 302c, and this resulted in a shortage of pressure required for removing an oxide film in some part. In this Example 11, the negative electrode foil-exposed portion 302c was bonded without having a damage such as a crack, but with an oxide film left in a very small part of the interface, and thus the bonding state was determined to be Good.

In Comparative Example 6, it was found that the negative electrode foil-exposed portion 302c had a large crack or break and had a large amount of metal powder. It is considered that this is because providing no end surface 513b on the second protrusion 513 led to excessive distribution of the force to be applied to the negative electrode foil-exposed portion 302c, and this resulted in a large crack or break in the negative electrode foil-exposed portion 302c.

Next, an experiment to confirm the relation between the interval W between the adjacent first protrusions 512 and the occurrence of wrinkling will be described.

Example 12

In Example 12, the interval W between the adjacent first protrusions 512 was 0.3 mm. The other configurations were equal to those of Example 4.

Example 13

In Example 13, the interval W between the adjacent first protrusions 512 was 0.0 mm. The other configurations were equal to those of Example 4.

Then, it was confirmed whether wrinkling occurred in the negative electrode foil-exposed portion 302c in Examples 4, 12 and 13. It should be noted that the bonding conditions were equal to those of the confirmation experiment for the bonding states in the aforementioned Examples 1 to 7 and Comparative Examples 1 to 5.

TABLE 3

| | Number of protrusions | Interval W (mm) | Occurrence of wrinkling |
|---|---|---|---|
| Example 4 | 3 | 2.8 | No |
| Example 12 | 3 | 0.3 | No |
| Example 13 | 3 | 0 | Yes |

With reference to Table 3, no wrinkling occurred in the negative electrode foil-exposed portion 302c in Examples 4 and 12. Meanwhile, wrinkling occurred in the negative electrode foil-exposed portion 302c in Example 13. It is considered this is because of the following reasons. When the first protrusions 512 were pressed against the negative electrode side bundled portion 302d, the first protrusions 512 caused the negative electrode foil-exposed portion 302c to deform. At this time, when the interval W between the adjacent first protrusions 512 was small (0.00 mm in this example), the negative electrode foil-exposed portion 302c being pressed by the first protrusions 512 in the lateral direction (i.e., the horizontal direction in FIG. 4) had no clearance between the adjacent first protrusions 512. It is considered that this led to wrinkling in the negative electrode foil-exposed portion 302c.

When the occurrence of wrinkling is taken into consideration, the interval W between the adjacent first protrusions 512 may be 0.3 mm or larger, and no upper limit is particularly set. Though not stated in the above experiment results, this could be understood also from the result that no wrinkling occurred when the number of first protrusions 512 was one (that is, the interval W was infinite). Therefore, the interval W between the adjacent first protrusions 512 is 0.3 mm or larger, and its upper limit is the length of the connection portion 42B of the negative electrode collector plate 4B (see FIG. 2). The upper limit depends on the size of the rectangular secondary battery 20.

It should be noted that the present invention is not limited to the aforementioned embodiment and includes various modifications. For example, although the aforementioned embodiment has been described in detail to clearly illustrate the present invention, the present invention need not include all of the configurations described in the embodiment. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add/remove/substitute a configuration of another embodiment.

For example, although the aforementioned embodiment shows an example of manufacturing a secondary battery using the ultrasonic horn of the present invention, the present invention is not limited thereto, and may be used for manufacturing other than the secondary battery.

In addition, although the aforementioned embodiment shows an example of forming the second protrusion 513 by a part of a truncated cone, the present invention is not limited thereto. The second protrusion 513 may be formed of a part of a sphere or an ellipsoid, for example.

In addition, although the aforementioned embodiment shows an example of forming the first protrusion 512 by a part of a sphere, the present invention is not limited thereto. The first protrusion 512 may be formed of a part of an ellipsoid or a truncated cone, for example.

When the first protrusion 512 and the second protrusion 513 are formed of a part of an ellipsoid, the major-axis (longer-axis) direction of the ellipsoid may be in parallel with the vibration directions of the ultrasonic vibration, or a minor-axis (shorter-axis) direction of the ellipsoid may be in parallel with the vibration directions of the ultrasonic vibration.

In addition, although the aforementioned embodiment shows an example of forming a plurality of first protrusions 512 to have the same shape and size and forming a plurality of second protrusions 513 to have the same shape and size, the present invention is not limited thereto. For example, the first protrusions 512 disposed in the opposite ends may have a size larger than that of the other first protrusions 512, and the second protrusion 513 disposed in the opposite ends may have a size larger than that of the other second protrusions 513. Further, for example, the first protrusions 512 disposed in the opposite ends may have a size smaller than that of the other first protrusions 512, and the second protrusion 513 disposed in the opposite ends may have a size smaller than that of the other second protrusions 513.

In addition, although the aforementioned embodiment shows an example of arranging the plurality of first protrusions 512 in a direction perpendicular to the vibration directions, the present invention is not limited thereto, and the plurality of first protrusions 512 may be arranged in the vibration directions.

In addition, although the aforementioned embodiment shows an example of providing the plurality of first protrusions 512 on the horn body 511 in one line along the longitudinal direction of the negative electrode collector plate 4B, the present invention is not limited thereto, and a plurality of lines each including the plurality of first protrusions 512 may be provided in the transverse direction of the negative electrode collector plate 4B, for example.

Figure 10:
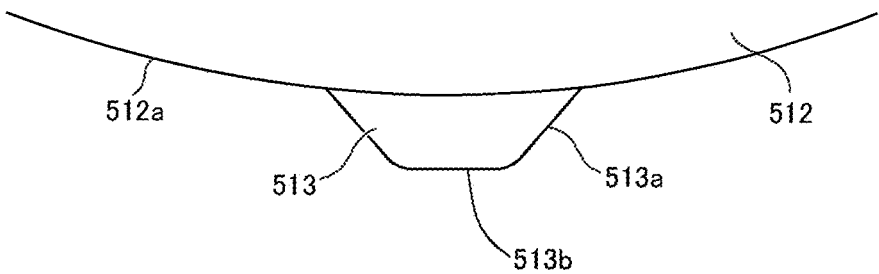
FIG. 10 is an enlarged view showing the second protrusion of the ultrasonic horn according to a modification of the present invention.

In addition, as in the modification shown in FIG. 10, the second protrusion 513 may be configured such that the second surface 513a and the end surface 513b are connected by a curved surface. In this case, the second protrusion 513 does not have a pointed portion, which can further reduce the likelihood of damaging metal foil.

REFERENCE SIGNS LIST

4A Positive electrode collector plate (metal member)
4B Negative electrode collector plate (metal member)
Rectangular secondary battery (secondary battery)
301a Positive electrode foil (metal foil)
302a Negative electrode foil (metal foil)
510 Horn (ultrasonic horn)
511 Horn body
511a Opposing surface
512 First protrusion
512a First surface
513 Second protrusion 513a Second surface
513b End surface
520 Anvil
W Interval
θ1, θ2 Angle
The invention claimed is:

1. An ultrasonic horn for ultrasonically bonding a plurality of stacked sheets of metal foil and a metal member by sandwiching the plurality of stacked sheets of metal foil and the metal member with an anvil and applying ultrasonic vibration in a state where the ultrasonic horn abuts on the plurality of stacked sheets of metal foil, the ultrasonic horn comprising:
a horn body,
a plurality of first protrusions that each have a first surface that is a curved surface and that protrude from an opposing surface of the horn body facing the anvil toward the anvil, and
a second protrusion formed at a center of the first surface of one of the plurality of first protrusions and protruding from the curved surface toward the anvil,
wherein the second protrusion includes an end surface that is a planar surface parallel to the opposing surface of the anvil, and
wherein the second protrusion further includes a second surface that is a curved surface connecting the end surface and the first surface of the first protrusion.

2. The ultrasonic horn according to claim 1, wherein the plurality of first protrusions are arranged in a straight line.

3. The ultrasonic horn according to claim 2, wherein adjacent protrusions among the plurality of first protrusions are disposed at an interval W of 0.3 mm or larger.

4. The ultrasonic horn according to claim 2, wherein the plurality of first protrusions are arranged as a straight-line array defining a longitudinal direction, and wherein the two endmost first protrusions located at opposite longitudinal ends of the straight-line array have a size larger than that of other first protrusions in the plurality of first protrusions.

5. The ultrasonic horn according to claim 2, wherein:
the second protrusion comprises a plurality of second protrusions respectively formed at centers of the first surfaces of corresponding ones of the plurality of first protrusions and arranged along the straight-line array, and wherein the two endmost second protrusions located at opposite longitudinal ends of the straight-line array have a size larger than that of the other second protrusions in the plurality of second protrusions.

6. The ultrasonic horn according to claim 2, wherein the plurality of first protrusions are arranged as a straight-line array defining a longitudinal direction, and wherein the two endmost first protrusions located at opposite longitudinal ends of the straight-line array have a size smaller than that of other first protrusions in the plurality of first protrusions.

7. The ultrasonic horn according to claim 2, wherein:
the second protrusion comprises a plurality of second protrusions respectively formed at centers of the first surfaces of corresponding ones of the plurality of first protrusions and arranged along the straight-line array, and wherein the two endmost second protrusions located at opposite longitudinal ends of the straight-line array have a size smaller than that of the other second protrusions in the plurality of second protrusions.

8. The ultrasonic horn according to claim 1, wherein (i) an angle (θ1) of the first surface relative to the opposing surface is between 5° and 30°, (ii) an angle (θ2) of the second surface relative to the opposing surface is between 15° and 35°, and (iii) the end surface has an area from 0.05 mm² to 1.15 mm$^2$; and wherein a distance from the opposing surface of the horn body to the end surface is within –0.1 mm to +0.3 mm of a value obtained by multiplying a thickness of each of the stacked sheets of metal foil by a number of the stacked sheets.

* * * * *